United States Patent [19]
Cohen et al.

[11] Patent Number: 6,005,943
[45] Date of Patent: *Dec. 21, 1999

[54] ELECTRONIC IDENTIFIERS FOR NETWORK TERMINAL DEVICES

[75] Inventors: Joshua L. Cohen, Highland Park, N.J.; Cecil A. Dean, Andover; Thomas L. du Breuil, Georgetown, both of Mass.; Daniel Nelson Heer, Newton, N.H.; David P. Maher, Largo, Fla.; Vance Eugene Poteat, Windham, N.H.; Robert John Rance, Andover, Mass.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/739,371

[22] Filed: Oct. 29, 1996

[51] Int. Cl.$^6$ .......................................................... H04L 9/00
[52] U.S. Cl. .............................................................. 380/30
[58] Field of Search ..................................... 380/4, 21, 30

[56] References Cited

U.S. PATENT DOCUMENTS

| | | | |
|---|---|---|---|
| 4,453,074 | 6/1984 | Weinstein | 380/30 |
| 5,511,122 | 4/1996 | Atkinson | 380/30 |
| 5,530,753 | 6/1996 | Easter et al. | 380/4 |
| 5,671,285 | 9/1997 | Newman | 380/30 |
| 5,745,879 | 4/1998 | Wyman | 380/4 |
| 5,757,924 | 5/1998 | Friedman et al. | 380/21 |

OTHER PUBLICATIONS

Odlyzko, A.M., Public Key Cryptography, p. 19, AT&T Technical Journal, Sep./Oct., 1994.

*Primary Examiner*—Salvatore Cangialosi
*Attorney, Agent, or Firm*—Cohen, Pontani, Lieberman & Pavane

[57] ABSTRACT

The generation of electronic identifiers for network interface units connected to a data network for use in detecting unauthorized decryption of encrypted data transmitted over the data network. A random number is generated for use as a private key decryption code and is stored in memory in each network interface unit. A public key is calculated from the stored private key using a non-invertible mathematical formula. If the calculated public key is unique, then a portion of the public key (e.g. a subset of its bits) is stored in a data provider database as an electronic identifier for use in detecting unauthorized decryption of data by the interface unit.

10 Claims, 2 Drawing Sheets

ELECTRONIC IDENTIFIERS FOR NETWORK TERMINAL DEVICES

BACKGROUND OF THE INVENTION

I. Field of the Invention

The present invention relates to identification codes for terminal devices connected to a data network. More particularly, the present invention relates to the generation of electronic identifiers which are assigned to network terminal devices and which can be used for monitoring access to network services.

II. Description of the Related Art

There is presently an epidemic in the communications industry involving theft of services. Such problem is particularly prevalent throughout the subscriber television industry wherein encrypted information or data (e.g. pay programming) is typically transmitted to subscribers' homes, only some of which are authorized to decrypt the information. The data is transmitted via cable or satellite and is received by an interface unit such as a set-top box connected to a television, or VCR, or computer which, for authorized subscribers, is programmed or configured to decrypt the received information.

The problem with such a system is that the interface units that receive and decrypt the transmitted data are frequently stolen, electronically manipulated or pirated, thereby enabling non-paying customers to obtain access to the transmitted data. As can be appreciated, such activity results in substantial lost revenues to the data providers, such as the subscriber television industry.

In response to the piracy and manipulation of decrypting devices such as set-top boxes which result in widespread theft of services, several techniques have been developed for terminating the ongoing reception and decryption of data by unauthorized users. Such techniques typically involve transmission of a high voltage signal over the transmission medium which, when received by the pirated devices, renders such devices inoperable. The problem with such techniques is that they do not sufficiently deter theft and manipulation of the interface units because the encrypted data will be accessible by the unauthorized users for at least a period of time i.e. until the unauthorized devices are rendered inoperable. Moreover, such techniques do not identify the location of the unauthorized interface units.

Accordingly, there is a need for a system for providing unique electronic identifiers to network terminal devices to facilitate monitoring of network services and to curtail theft of services and piracy of network interface units.

SUMMARY OF THE INVENTION

A technique and apparatus for generating unique electronic identifiers for use in monitoring the decryption of encrypted data transmitted in a data network is disclosed. The inventive technique is performed by generating a random number which serves as the private key portion of a two-key encryption/decryption scheme. The private key is stored in memory contained in a network interface unit (NIU) which, preferably, interfaces a terminal device with the data network. A public key for the two-key encryption/decryption scheme is calculated from the private key using a non-invertible mathematical formula. Once the public key is calculated, it is checked or compared with other public keys from other network interface units to determine whether the calculated public key is unique. If so, at least a portion of the new public key is stored in a database accessible by the data network and serves as an electronic identifier of the particular NIU. This inventive technique thus allows a data network provider to monitor and curtail the unauthorized decryption of encrypted data by NIU's connected to the data network by utilizing the stored electronic identifiers to identify and differentiate authorized and unauthorized user access.

An electronic identifier apparatus is also disclosed herein. The apparatus includes a random number generator for generating a random number comprising a private key for use by the NIU in decrypting received encrypted data from the data network, and storing the random number in memory connected to the random number generator. The apparatus also includes a calculating means for calculating a public key from the private decryption key according to a non-invertible mathematical formula and a means for determining if the calculated public key is unique. The unique public key is stored in a database accessible by the data network to enable detection of unauthorized decryption.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENT

Figure 1:
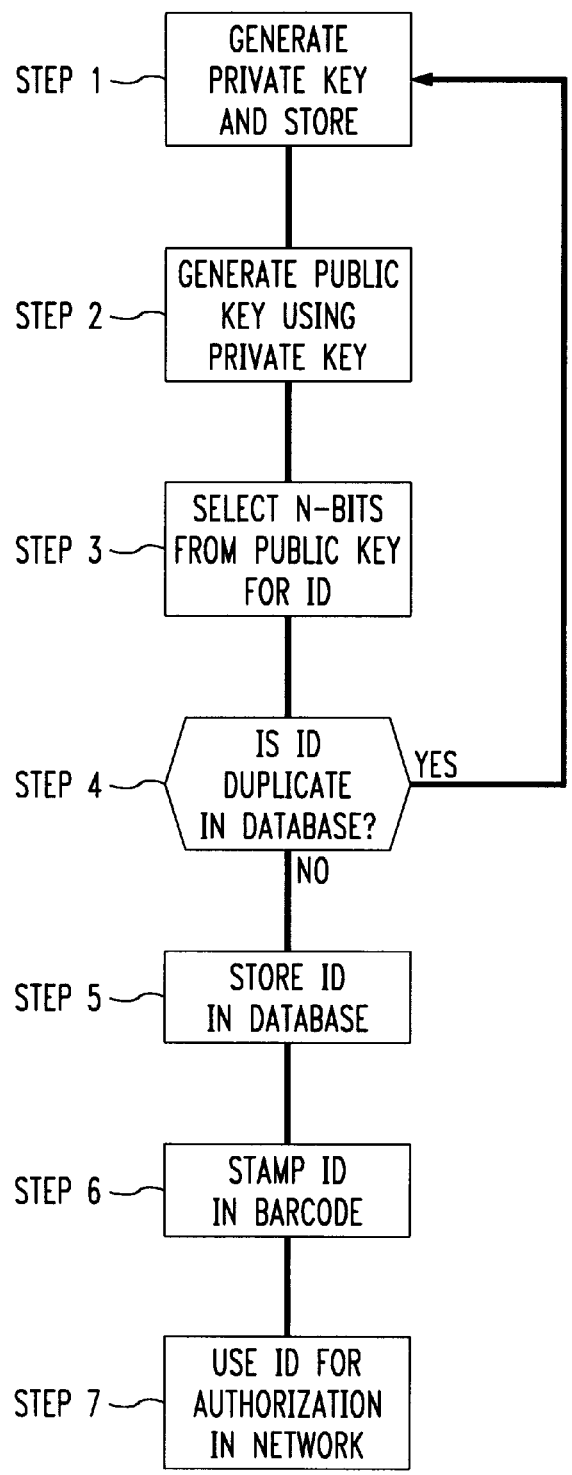
FIG. 1 is a flow chart illustrating the steps of a method for generating unique electronic identifiers in accordance with the present invention.

An illustrative and currently preferred embodiment of the present invention will be discussed in the context of terminal devices connected to a video information delivery system such as a so-called Video On Demand (VOD) or other pay-subscriber data systems. Such a terminal device may be, for example, a Digital Video Home Terminal (DVHT) of the type developed by Lucent Technologies, Inc. It is to be understood, however, that the present invention is in no way limited to such systems or devices, as the claimed invention may and is intended to be practiced to assign electronic identifiers to other types of terminal devices such, for example, as facsimile machines, telephones, computers, etc. which are connected to non-video data networks for receiving other types of data, e.g. financial, medical, etc.

For the generated electronic identifiers to be practical, certain criteria must be met. First, each electronic identifier must be unique from all other generated electronic identifiers—at least in the same network or receiving the same data—so that they can be distinguished from each other. In addition to uniqueness, the electronic identifiers must be tamper-proof to discourage or prevent theft and piracy of the terminal devices to which the electronic identifiers are assigned. Electronic identifiers meeting these criteria will enable service providers, who record or store the numerous electronic identifiers in a central memory, to use them for selectively disabling targetted terminal devices that are reported stolen and for locating the stolen devices, most desirably along with the persons in possession of the devices.

With respect to the first criteria, i.e. uniqueness, and in accordance with the present invention, it is preferable that each electronic identifier comprise a segment of the public portion of a two-part cryptographic key exchange addressing scheme—containing a private portion or key and a public key. One example of a key exchange scheme is, by way of example, the Diffie-Helman key exchange method as described in Odlyzko, A. M., *Public Key Cryptography*, p. 19, AT&T Technical Journal, September/October, 1994. In such a cryptographic addressing scheme, a private key—which is personal to a particular device and is not readable by outside devices—is used to generate a public key according to a particular mathematical formula. The mathematical formula used for this purpose is non-invertible, that is, even one having knowledge of the mathematical formula and of the public key cannot derive the private key therefrom; as used herein, the term "non-invertible" denotes such a mathematical formula and relationship. The exchange of information between, for example, a receiving device and a transmitting device both connected to a data network is accomplished by causing the receiving device to provide its public key to the transmitting device, which then uses the is receiving device public key to encrypt the information to be transmitted. The encrypted information is then sent to the receiving device which uses its private key to decrypt the received data.

Applicants have discovered that deriving an electronic identifier from the public key portion of such an encryption scheme results in a substantially unique numbering system which can be used in a manner similar to the use of serial numbers in product manufacturing—except, of course, that the electronic identifiers will not be generated in a sequential manner but will, instead, be random. Although the key exchange described in the aforementioned reference may be used in conjunction with applicants' invention described herein, it should be noted that applicants' invention is not limited thereby and will operate with other cryptographic schemes as well.

Turning now to the drawings, and initially to FIG. 1 thereof, the steps comprising the preferred method of generating electronic identifiers in accordance with the present invention will now be described. As shown in FIG. 1, the first step is to generate a private key and to store the private key in a memory which is preferably tamper-proof. The private key may by way of illustrative example be generated using known random number generators. Once generated, the private key is stored in a memory which, if an unauthorized access is attempted, will be destroyed and preferably render a terminal device or interface unit incorporating the memory inoperable.

Once the private key is generated, step two is performed wherein the public key is derived from the private key. As stated above, the public key is derived from the private key using a non-invertible mathematical formula so that one having knowledge of the public key and formula cannot use the same to calculate or obtain the private key. A suitable mathematical formula for this purpose is:

public key=$x^{(private\ key)}$ mod(p)

wherein p is a large prime number and x is an integer.

The public key, or a portion thereof, is then suitable for use as a potential electronic identifier for the particular device associated with the private key. The portion of the private key selected may be, for example, a group of N-bits wherein N is an arbitrary number determined by the amount of devices requiring an identifier. This is shown as step 3 of FIG. 1.

With continuing reference to FIG. 1, once the potential electronic identifier is selected, it is compared with other electronic identifiers that have already been stored in a central database such, for example, as a database maintained by the data network provider or the manufacturer of the terminal devices to which the electronic identifiers are assigned. If the potential electronic identifier is unique, i.e. there is no duplicate thereof in the central database, then the potential electronic identifier is stored in the central database and used as the electronic identifier for that particular terminal device. This is shown in steps 4 and 5 in FIG. 1.

Once the electronic identifier has been selected, it may be printed out on a visible or machine readable label (e.g. bar code) affixed to the terminal device so that the device can be scanned when purchased or when assigned to or installed for a particular subscriber. The scanned identifier can be stored, along with the address of the subscriber, in the provider database. As explained below, such information can be extremely helpful in determining whether particular terminal devices are stolen and/or being used by unauthorized users to decrypt data.

By utilizing all or a portion of the public key from the two-key encryption system described more fully above, the network data provider can monitor the recipients of transmitted data to ensure that only authorized access occurs. Such monitoring to ensure only authorized access may take place under at least two distinct circumstances. The first occurs when, for example, an authorized subscriber subscribes with a data provider to obtain a particular data service. At that point, a network interface unit such as a DVHT is assigned to that subscriber and is installed by a data provider employee. During the installation process, a network address is also assigned and stored in memory along with the electronic identifier for that particular DVHT.

When the authorized subscriber wishes to receive data, the interface unit will provide the public key (including the electronic identifier) to the network provider—which has access to both the subscriber's network address and the electronic identifier stored in a provider database—and the provider can then determine (based on the electronic identifier and the network address) whether the subscriber is authorized to receive the requested data at the particular address. In other words, if the electronic identifier is associated with an authorized user, i.e. an identifier that has not been previously reported as assigned to a stolen DVHT, and the address of that DVHT corresponds with the associated electronic identifier, then the data will be encrypted using the subscriber's public key and transmitted to the subscriber. Upon receipt, the subscriber's private key is used to decrypt the data for use by the subscriber.

The second or other circumstance in which monitoring of services by a provider is performed to detect unauthorized access of decrypted data can occur when a number of interface units or DVHT's are stolen from a storage location or warehouse. When such an event occurs, the electronic identifiers associated with or designating the stolen units will not have been assigned to specific subscribers. Thus, when one of the stolen DVHT's is connected to the network and transmits its electronic identifier to the data provider, the data provider can readily verify that the particular electronic identifier is, in fact, an unauthorized receiver of the data and no data will be provided in a decipherable format to that particular unit—i.e. data will not be encrypted according to that particular unit's public key and, thus, cannot be decrypted by the corresponding private key.

Figure 2:
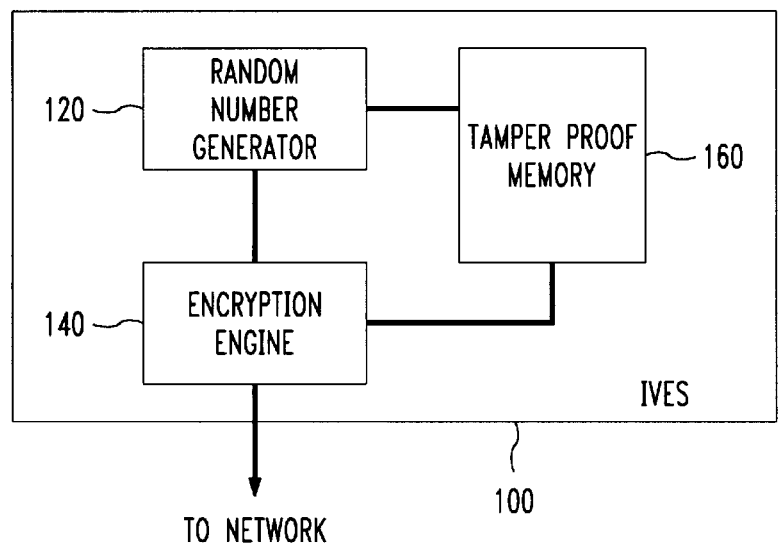
FIG. 2 is a block diagram of a module for performing the method illustrated in FIG. 1.

The above-described inventive method may, for example, be practiced using a network interface integrated circuit (IC) 100 such as that shown in FIG. 2. The IC 100 includes a random number generator 120. The random number generator generates the private key portion of the two-key encryption scheme, from which the public key is calculated in the manner set forth above. In a preferred embodiment, the random number generator will generate the private key only during its initial power-up, i.e. the first time that the IC 100 is provided with an appropriate operating voltage. A suitable IC 100 for this purpose is the IVES chip which is disclosed in U.S. patent application Ser. No. 08/550,910, filed Oct. 31, 1995, entitled "Data Encryption Security Module" and assigned to Lucent Technologies, Inc.

As shown in FIG. 2, the chip 100 also includes an encryption engine 140 and a tamper-proof memory 160. The generated private key is stored in the tamper-proof memory 160, which is also interfaced with the encryption engine 140, and is used by the encryption engine for decrypting received messages from the data network. Memory 160 is tamper-proof—that is, any unauthorized attempt to change the private key or to make adjustments thereto will render the IC 100 inoperable; this further enhances the security of the electronic identifiers.

Figure 3:
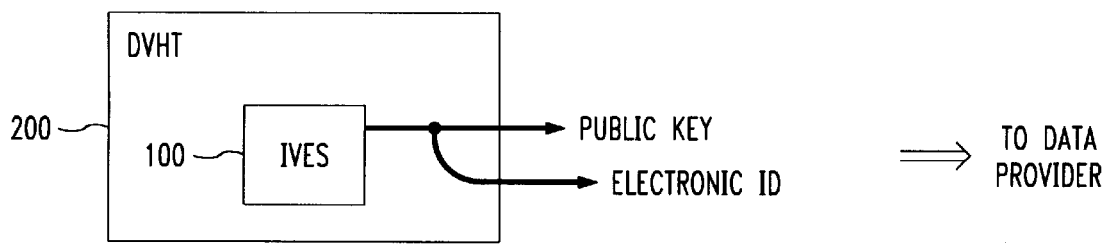
FIG. 3 is a block diagram of a network interface unit incorporating the module of FIG. 2.

With reference now to FIG. 3, a DVHT 200 is shown containing the IVES chip 100 in accordance with the present invention. As shown, the IVES chip 100 transmits its unique electronic identifier to the data provider and also transmits its public key for use by the data provider—assuming that the electronic identifier is approved—for encoding data which is provided to the DVHT 200. As should by now be appreciated, the method and apparatus described hereinabove not only provides for increased security in network data access by ensuring that only authorized and approved electronic identifiers, corresponding to authorized interface units, receive certain data, but will also assist in curing the theft and piracy of the interface units.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method of generating an electronic identifier for a single-chip network interface unit (NIU) connected to a data network for use in detecting unauthorized decryption by the NIU of encrypted data transmitted over the data network, said method comprising the steps of:

generating a random number by using a random generator comprising a component of the NIU on the NIU chip;

storing said generated random number in a memory of the network interface unit, said stored random number comprising a private key for use by the NIU in decrypting received encrypted data so that said stored random number is inaccessible outside of the NIU;

calculating a public key from the private decryption key using a non-invertible mathematical formula;

determining if said calculated public key is unique; and storing, as an electronic identifier of the NIU, at least a portion of the unique public key in a database accessible by the data network.

2. The method of claim 1, wherein said public key comprises a set of a predetermined number of bits and wherein said electronic identifier comprises a predetermined subset of bits of said public key set of bits.

3. The method of claim 1, wherein said public key is stored in said memory of the NIU.

4. The method of claim 1, wherein said public key is calculated using the mathematical formula public key=$x^{(private\ key)} \mod(p)$, wherein p is a large prime number and x is an integer.

5. The method of claim 1, wherein said memory is tamper-proof.

6. The method of claim 1, wherein said determining step comprises comparing said calculated public key to other public keys contained in said database accessible by the data network.

7. The method of claim 1, further comprising the step of affixing the electronic identifier to the NIU.

8. A device for generating an electronic identifier for a single-chip network interface unit (NIU) connected to a data network, for use in detecting unauthorized decryption by the network interface unit of encrypted data transmitted over the data network, said device comprising:

a random number generator contained on the single chip with the NIU and forming a component of the NIU for generating a random number comprising a private key for use by the NIU in decrypting received encrypted data from the data network;

a memory connected to said random number generator and formed on said single chip;

means for storing said generated random number in said memory so that said stored random number is inaccessible outside of the NIU, said storing means being connected between said random number generator and said memory;

means for calculating a public key from the private decryption key in accordance with a non-invertible mathematical formula;

means for determining whether said calculated public key is unique; and means for storing, in a database accessible by the data network, at least a portion of the unique calculated public key.

9. The device of claim 1, wherein said calculating means comprises a microprocessor, and wherein said mathematical formula is public key=$x^{(private\ key)} \mod(p)$, wherein p is a large prime number and x is an integer.

10. The device of claim 7, wherein said memory is contained in the NIU and wherein said memory is tamper-proof.

* * * * *